Figure 1:
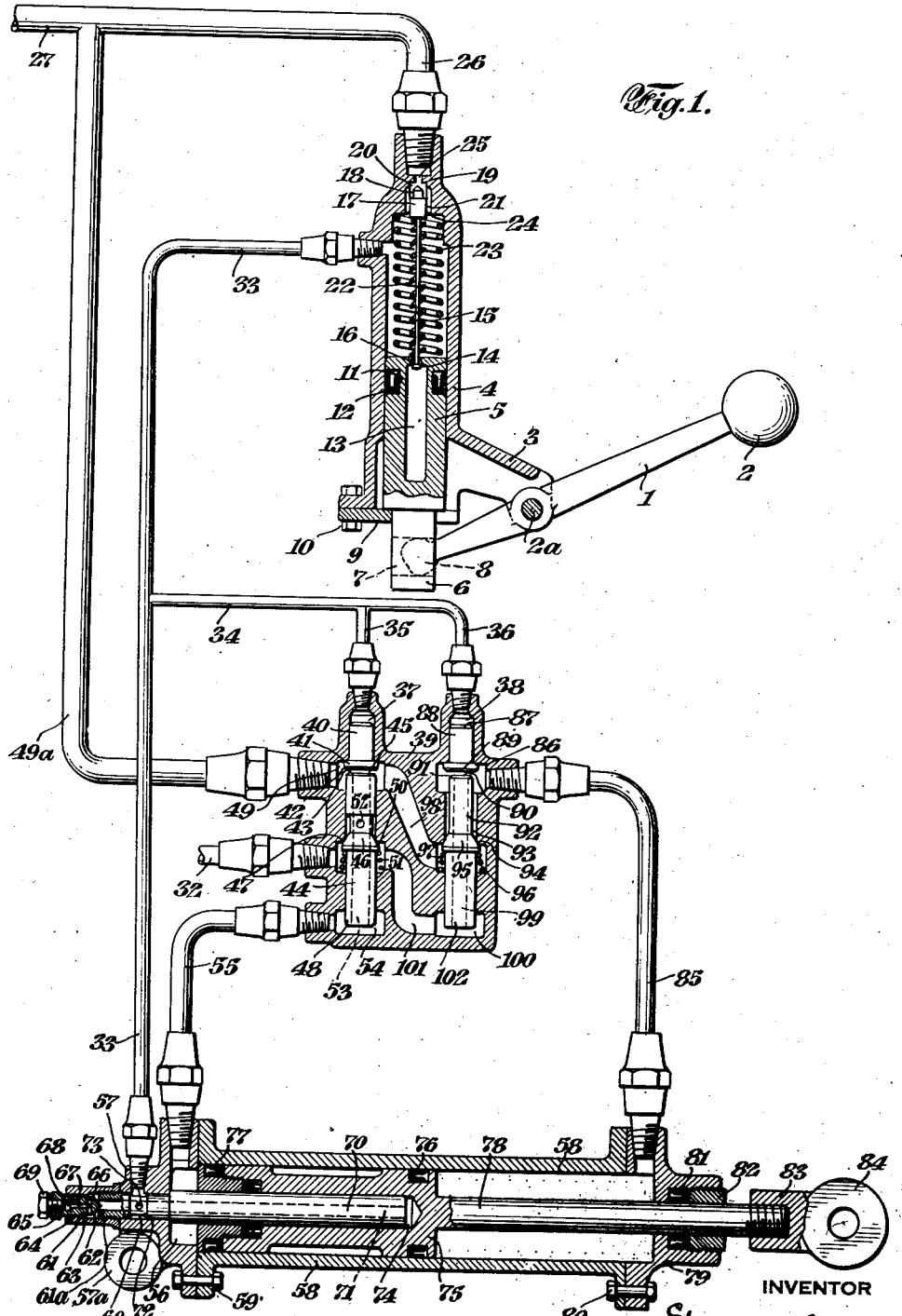

June 27, 1944.  E. A. ROCKWELL  2,352,344
HYDRAULIC TRAVEL MODULATION CONTROL
Filed Dec. 7, 1940  2 Sheets-Sheet 1

INVENTOR
Edward A. Rockwell
BY Arthur Wright
ATTORNEY

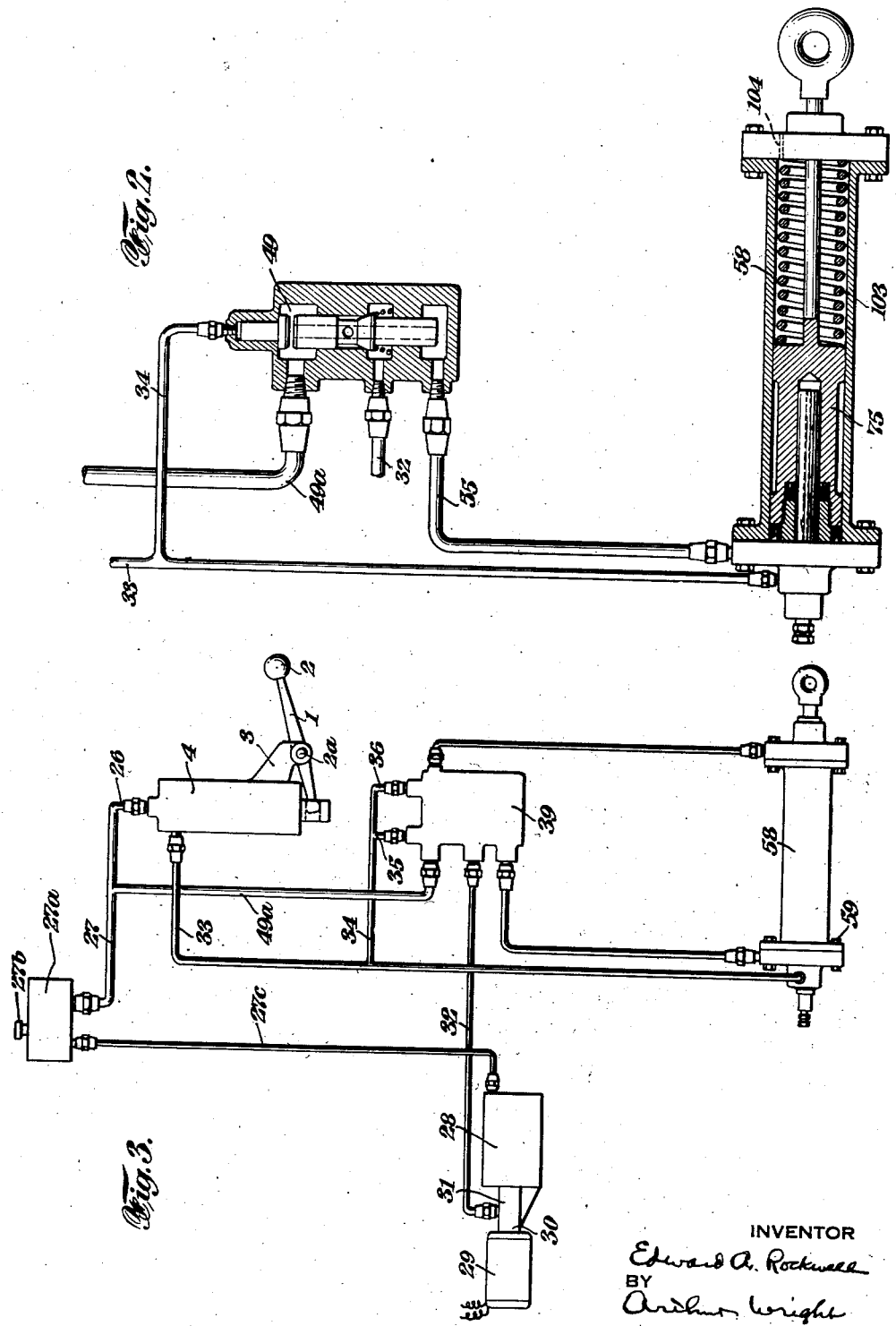

Patented June 27, 1944

2,352,344

UNITED STATES PATENT OFFICE 2,352,344

HYDRAULIC TRAVEL MODULATION CONTROL

Edward A. Rockwell, West Hartford, Conn.

Application December 7, 1940, Serial No. 369,003

10 Claims. (Cl. 121—41)

My invention relates to an apparatus for controlling the application of pressures to a part to be moved so as to obtain the desired amount of travel in the control of said part and also so as to apply any desired modulated pressures thereto.

The object of my invention is to provide an apparatus of the above character, which is applicable to the control of a part to be moved for any desired purpose, as for example so as to obtain accurate controls of steering gears, locomotive reverse gears and valve cut-offs, or for any other desired purpose, and so as to prevent undesired oscillation or limiting of the part to be moved. A further object is to apply any desired modulated pressure at any point of travel of the part to be moved. A further object is to provide an apparatus of this character in which the modulated pressues are applied not only in the advance of the part in one direction but in the withdrawal of said part by a movement in the opposite direction. Another object is to accomplish this purpose by means of one or more hydraulic valves, which preferably are in fixed position and which, also, can be placed at any desired point irrespective of the travel of the part to be moved, and so that, if desired, the monitor device connected to the valves can be placed at any other desired point and directly connected to the part to be moved. Still another object is to provide such an apparatus which may be controlled manually or by any desired mechanism but in which the controlling element has substantially the same degree of travel as the work-performing part. Further objects of my invention will appear from the detailed description of the same hereinafter.

My invention is capable of embodiment in many different forms but by way of illustration I have shown only two forms thereof in the accompanying drawings in which—

Fig. 1 is a diagrammatic vertical section of a controlling apparatus made in accordance with my invention, showing two valve elements which operate simultaneously, one for modulating the admission and escape of pressure liquid for the advance of the work-performing part and another for modulating the admission and escape of the pressure liquid applied for the movement of the work-performing part in a reverse direction;

Fig. 2 is a similar view of a modified form thereof showing only a single valve element for modulating the admission and escape of the modulated pressure liquid; and Fig. 3 is an assembly drawing of the system containing the form of the invention shown in Fig. 1, and which is applicable likewise to the modification shown in Fig. 2.

In the drawings, referring first to Figs. 1 and 3, I have shown a manually actuated lever 1 having a handle 2 which, however, may be operated by any desired moving element, moved mechanically or otherwise, said lever 1 being carried on a pivot 2a in a lateral extension 3 on a cylinder 4 in which there is arranged to reciprocate a piston 5. Said piston 5, on its lower end, has an extension 6 provided with a slot 7 in which a rounded end 8 of the lever 1 is carried. The piston 5 is retained in place by a head 9 connected to the cylinder 4 by bolts 10. Furthermore, the said piston 5 has an annular recess 11 carrying a seal 12, U-shaped in cross section, of rubber or any other desired material. Within the said piston 5 there is a cylindrical chamber 13 in which a head 14 of a rod 15 is movably carried, said rod 15 passing out through a small hole 16 in the upper end of the piston 5. The said rod 15, on its upper end, carries a valve member 17 having a conical valve 18 on the end thereof, seating on a valve seat 19 in a passageway 20, in the cylinder 4, having flutes 21 to provide passageways for the liquid around the valve member 17. A spring 22, around the rod 15, keeps the valve member 17 fully extended upwardly as far as permitted by the head 14. A further spring 23, to retract the piston 5, is supported on the upper end of the piston 5 and rests, at the other end of the spring, on a shoulder 24 on the interior of the cylinder 4. The top of the cylinder 4 has a passageway 25 communicating with the valve seat 19 and leading to a bent pipe 26 for permitting the return of discharged hydraulic liquid by a pipe 27 to any desired system for the storage and placing under pressure of the returned liquid so as to thereafter supply the liquid under pressure for the operation of the apparatus, as hereinafter described.

This may comprise, for example, the apparatus shown for this purpose and described in detail in my patent upon Electroflow power supply system, No. 2,136,638, granted November 15, 1938. This I have shown diagrammatically in Fig. 3 herein. For this purpose the pipe 27 may go to a filler tank 27a, having a vented filler cap 27b, connected by a pipe 27c to an accumulator 28, connected to an electric motor 29, a pump 30 driven by said motor, a high pressure storage chamber 31, and a supply pipe 32 for the high pressure liquid after having been placed under pressure by said pump 30 in said chamber 31.

The hydraulic liquid contained in the system, which may be of any desired character and which is present in the cylinder 4, due to the location of the latter permits the escape therefrom of any accumulated air past the valve element 18. This hydraulic liquid is placed under manual pressure by the piston 5 and discharged from the cylinder 4 by a pipe 33 having a branch pipe 34 which in turn has branches 35 and 36 leading, respectively, to the upper ends of valve-operating cylinders 37 and 38 in a dual valve casing 39.

The cylinder 37 carries a plunger 40 having a head 41 thereon provided with a flat outlet valve seat 42 for cooperation with a valve surface 43 on a tubular valve 44 provided with a chamfered edge 45 for making the diameter of the valve seat 43 smaller than the diameter of the seating point of a conical high pressure inlet valve 46 on the tubular valve 44 cooperating with a valve seat 47 in the casing 39, which valve seat 47 is in turn smaller in diameter than a lower end 48 of said tubular valve member 4. The valve 42, 43 is located in an exhaust chamber 49 which is connected by a pipe 49a to the pipe 27. The valve 46, 47 is located in a high pressure chamber 50 which is connected to the pipe 32 and in said chamber 50 there is a spring 51 for normally keeping the conical valve 46 seated.

The high pressure liquid received from the pipe 32 and admitted past the conical valve 46 when unseated by the manual pressure exerted on the plunger 40 to close the valve 42, 43, passes through holes 52 to a cylindrical passageway 53 within the tubular valve 44 and thence into an end chamber 54 in the casing 39 in which the end 48 of the tubular valve is received and from this point the modulated high pressure liquid which has been admitted to the chamber 54 by the valve 46, 47 passes downwardly by a pipe 55 to a chamber 56 within a head 57, connected to a fixed pivot by an eye in a boss 57a, on a work cylinder 58 to which it is fastened by bolts 59.

The said head 57, furthermore, is connected to one end of the pipe 33 containing the liquid under manual pressure so as to communicate with a cylindrical chamber 60 having at its rear end an air bleeder valve casing 61 provided with a valve seat 61a on which there is normally seated a conical bleeder valve 62 carried on a bleeder valve stem 63 which has a screw thread 64 and a squared head 65 for securing it in the bleeder valve casing 61. The stem 63, furthermore, has a transverse passageway 66 communicating with a longitudinal passageway 67 leading to an internally screw-threaded chamber 68 normally closed by a screw 69.

In the chamber 60 there is carried a stationary tube 70 having a longitudinal passageway 71 communicating with an annular channel 72 by means of holes 73 and thence with the pipe 33. The said tube 70, furthermore, is located within a cylinder 74 extending longitudinally in a plunger 75 having forward and rear seals 76 and 77, respectively, to seal the plunger 75 within the work cylinder 58. The said plunger 75, furthermore, has a stem 78 which passes out through a head 79 secured by bolts 80 to the work cylinder 58. The head 79 has a seal 81 held in place by a tubular screw 82. The end of the stem 78 is connected to a screw-threaded eye-member 83 having an eye 84 to enable it to be connected to any desired part to be moved, for the performance of work.

Furthermore, the head 79 is connected by a pipe 85 to a chamber 86 for receiving a head 87 on a plunger 88 carried in the cylindrical chamber 38. The said head 87 has a flat high pressure inlet valve seat 89 cooperating with a valve surface 90 adjacent to a chamfered edge 91 on the upper end of a tubular reverse modulation valve 92 which is adapted to be moved by the plunger 88 within a cylindrical passageway 93 in the casing 39. The said passageway 93 has therein an outlet valve seat 94 against which a conical valve 95 on the tubular valve member 92 is adapted to seat. The conical valve 95 is normally moved into seated position by a spring 96 in a chamber 97 in the casing 39 which communicates by a passageway 98 to the chamber 49. Also, said tubular valve member 92 has a longitudinal passageway 99 leading to an end chamber 100 connected by a passageway 101 to the high pressure chamber 50. The chamber 100 also receives a lower end 102 of the tubular valve member 92 which is larger in diameter than the valve seat 94, which in turn is larger than the valve surface 90.

The modification of my invention shown in Fig. 2 is constructed substantially the same as the form of my invention shown in Figs. 1 and 3 except that in this instance the tubular valve 92 and appurtenant parts thereof are omitted and except that in this instance the piston 75 is retracted by a spring 103, located within the work cylinder 58. Also, in this modification of my invention the pipe 85 is omitted and replaced by a vent 104.

In the operation of the form of my invention shown in Figs. 1 and 3, when the manual controlling lever 1 is pressed downwardly this will close the valve 18, 19, trapping the liquid in the cylinder 4, which will then be forced downwardly through the pipe 33 and into the cylinder 74 according to the position where the piston 75 is located owing to the resistance which is exerted by the part to be moved to perform work, 83. The cylinder 74 insures that the travel of the part 83 will be substantially the same as the travel of the hand lever 1. At the same time the manual pressure upon the liquid in the pipe 34 will close the valve 42, 43 as well as the valve 89, 90 so as to unseat to the desired extent the valve 46, 47 and the valve 94, 95. However, the high pressure normally acting on the lower face of the plunger 88 as compared with the lower pressure acting beneath the plunger 44 in the on-modulation will cause these valves to open and close somewhat differently, and the same is true in the reverse manner in the off-modulation. Accordingly, the high pressure liquid in the pipe 32 will pass through the holes 52 into the passageway 53 and thence through the pipe 55 to the left face of the piston 75, thus applying any desired amount of pressure towards the right on the work-performing piston 75. It will be understood that as the work is advanced for any reason, the piston 75 will be moved up accordingly by the pressure liquid from the pipe 55, but irrespective of whether the work advances or remains stationary and irrespective of the position of the piston 75, any desired degree of pressure on the work is attainable corresponding to the amount of high pressure liquid admitted to the pipe 55 from the inlet valve 46, 47 and when any such desired pressure is attained the reaction of the pressure applied will cause the valve 46, 47 to close until some further increment of liquid is admitted for obtaining an increased pressure.

When the desired degree of movement of the lever 1 (which is proportional to the movement of the piston 75) is attained and the lever 1 is held stationary, the piston 75 still moves under the flow of fluid from the pipe 55. After movement of the lever 1 ceases the piston 75 moves just enough to increase the volume of the chamber 74 so that the pressure force acting on the pistons 40, 88 due to the fluid pressure in the pipes 33, 36 is lowered and the valves 46 and 95 close and move the means 40 and 88 back in their chambers, the fluid pushed back by means 40 and 88 flowing in the space created in the chamber 74 by moving the piston 75. As the valves 46 and 95 close, the piston 75 movement ceases. This is accomplished at all times by obtaining a "feel" on the hand lever 1 coordinate to the pressure that has been admitted to the pipe 55 for the performance of work which is due to the upwardly directed pressure on the central face of the piston 40 and the peripheral lower face of the piston 88, when the valves 41 and 89 are in closed position. Also, the amount of travel of the piston 75 for the performance of work will be approximately coordinate to the amount of travel of the hand lever 1. Also, if the pressure is applied rapidly by the lever 1, a corresponding fast movement of the piston 75 will be obtained and a high effective force will be produced by this quick movement of the lever 1. While this movement of the piston 75 to the right is taking place there is a coordinate release of pressure liquid from the right end of the cylinder 58 by the pipe 85 and it will be understood that any increments of pressures applied through the pipe 55 to the left face of the piston 75 will be accompanied by a coordinate escape of increments of the pressure liquid from the right face of the piston 75 due to the reverse modulating valve member 92 connected with the pipe 85. In other words, similar pressures will be obtained on both faces of the piston 75 in any one static position thereof and at any one degree of pressure desired to be applied, it being understood that at any such static position all the valves 42, 43 and 46, 47, as well as 89, 90 and 94, 95, will be in closed position. This is accomplished, as before stated, inasmuch as the opening of the high pressure inlet valve 46, 47, as above described, to admit an increment of the high pressure liquid to the left face of the piston 75, will be accompanied by a simultaneous opening of the release valve 94, 95, to release to the same extent the high pressure liquid which is normally present on the right face of the piston 75, this action taking place until the differential pressure applied to each of the tubular valve members 64 and 92 causes the valves 46, 47 and 94, 95 to close. The valve 94, 95 is normally closed and, therefore, the high pressure liquid normally passes from the passageway 101 through the tubular passageway 99 and the normally open valve 89, 90 through the pipe 85 to the right face of the piston 75. The off modulation of the operation of the valve member 64 and 92 will operate in the reverse manner. In the case of the release of increments of pressure liquid by the partial opening of the valve 42, 43, the valve 89, 90 will be partially opened, thus causing increments of the high pressure liquid to pass from the chamber 100 through the passageway 99 and the pipe 85 to the right face of the plunger 75, which will be accompanied by the escape of corresponding increments of high pressure liquid through the pipe 55, passageway 53 and pipe 49a. Thus, in either the on or off modulation of the liquid the piston 75 will be actuated to exert the desired modulated force, either to the right or to the left, as desired, and while the said piston 75 is caused to advance or be retracted or to be maintained at any desired point in its travel it will be caused to follow positively the movement of the manual lever 1 and to be maintained in any of these positions by positively exerted pressures of the hydraulic liquid on both faces of said piston simultaneously. Also, the hand lever and the part moved to perform work will remain in step, as even when the hand lever 1 is withdrawn and then operated again, both will start the work performing action at the same point where it had previously been interrupted.

The operation of the modification of my invention shown in Fig. 2 is the same as described in connection with Figs. 1 and 3, except that in this instance the tubular valve element 92 and valves associated therewith are substituted by the presence of the spring 103, which brings about the retraction of the piston 75. In this instance the pipe 85 acts as a breather connection from the right face of the piston 75, which is connected thereby to the pipe 49a by means of the chamber 49. However, in this instance there is also present both an on and off modulation of liquid from the left face of the piston 75 in the advance and retraction of said piston.

It will be understood, of course, that any gaseous fluid may be used in place of the hydraulic liquid herein, although not so advantageously as where hydraulic liquid is used.

While I have described my invention above in detail I wish it to be understood that many changes may be made therein without departing from the spirit of the same.

I claim:

1. In combination, a source of fluid under pressure, an element adapted to be moved thereby, and fluid pressure means for actuating the same comprising a controlling device, a valve adapted to apply, by modulated increases of pressure, a fluid pressure for urging said element in one direction and a second valve adapted to correspondingly release, by modulated amounts of pressure, a fluid pressure which urges said element in the opposite direction, said first valve containing a normally closed high pressure inlet valve element and said second valve comprising a normally closed outlet valve element, said two valves containing also, respectively, a normally open outlet valve and a normally open high pressure inlet valve, both of said last-mentioned valves having a fluid pressure connection to said controlling device.

2. In combination, a source of liquid under pressure, an element adapted to be moved thereby, and hydraulic means for actuating the same comprising a controlling device, a valve adapted to apply, by modulated increases of pressure, a hydraulic pressure for urging said element in one direction and a second valve adapted to correspondingly release, by modulated amounts of pressure, a hydraulic pressure which urges said element in the opposite direction, said valves being constructed to apply to said element an increase of the amount of liquid applied from either of said valves and a corresponding decrease of the amount of liquid from the other valve, said first valve containing a normally closed high pressure inlet valve element and said second valve comprising a normally closed outlet valve element, said two valves containing also, respectively, a normally open outlet valve and a normally open high pressure inlet valve, both of said last-mentioned valves having a hydraulic connection to said controlling device.

3. In combination, a source of fluid under pressure, an element adapted to be moved thereby, and means for actuating the same comprising a controlling device, a valve adapted to apply, by modulated increases of pressure, a fluid pressure for urging said element in one direction and a second valve adapted to correspondingly release, by modulated amounts of pressure, a fluid pressure which urges said element in the opposite direction, said first valve containing a normally closed high pressure inlet valve element and said second valve comprising a normally closed outlet valve element, said two valves containing also, respectively, a normally open outlet valve element and a normally open high pressure inlet valve element, both of said last-mentioned valve elements having a fluid pressure connection to said controlling device and a fluid pressure connection between the outlet valve elements of said two valves.

4. In combination, a source of liquid under pressure, an element adapted to be moved thereby, and means for actuating the same comprising a controlling device, a valve adapted to apply, by modulated increases of pressure, a hydraulic pressure for urging said element in one direction and a second valve adapted to correspondingly release, by modulated amounts of pressure, a hydraulic pressure which urges said element in the opposite direction, said valves being constructed to apply to said element an increase of the amount of liquid applied from either of said valves and a corresponding decrease of the amount of liquid from the other valve, said first valve containing a normally closed high pressure inlet valve element and said second valve comprising a normally closed outlet valve element, said two valves containing also, respectively, a normally open outlet valve element and a normally open high pressure inlet valve element, both of said last-mentioned valve elements having a hydraulic connection to said controlling device and a hydraulic connection between the outlet valve elements of said two valves.

5. In combination, a source of fluid under pressure, an element adapted to be moved thereby, and fluid pressure means for actuating the same comprising a controlling device, a valve adapted to apply, by modulated increases of pressure, a fluid pressure for urging said element in one direction and a second valve adapted to correspondingly release, by modulated amounts of pressure, a fluid pressure which urges said element in the opposite direction, said first valve containing a normally closed high pressure inlet valve element and said second valve comprising a normally closed outlet valve element, said two valves containing also, respectively, a normally open outlet valve element and a normally open high pressure inlet valve element, both of said last-mentioned valve elements having a fluid pressure connection to said controlling device, a fluid pressure connection between the outlet valve elements of said two valves, and a fluid release conduit connected to said last-mentioned fluid pressure connection and to said controlling device.

6. In combination, a source of liquid under pressure, an element adapted to be moved thereby, and hydraulic means for actuating the same comprising a controlling device, a valve adapted to apply, by modulated increases of pressure, a hydraulic pressure for urging said element in one direction and a second valve adapted to correspondingly release, by modulated amounts of pressure, a hydraulic pressure which urges said element in the opposite direction, said valves being constructed to apply to said element an increase of the amount of liquid applied from either of said valves and a corresponding decrease of the amount of liquid from the other valve, said first valve containing a normally closed high pressure inlet valve element and said second valve comprising a normally closed outlet valve element, said two valves containing also, respectively, a normally open outlet valve element and a normally open high pressure inlet valve element, both of said last-mentioned valve elements having a hydraulic connection to said controlling device, a hydraulic connection between the outlet valve elements of said two valves, and a liquid conduit connected to said last-mentioned hydraulic connection and to said controlling device.

7. In combination, a source of liquid under pressure, an element adapted to be moved thereby, and hydraulic means for actuating the same comprising a controlling device, a hydraulic chamber connected to expand with the movement of said element and connected to said controlling device, a valve adapted to apply, by modulated increases of pressure, a hydraulic pressure for urging said element in one direction and a second valve adapted to correspondingly release, by modulated amounts of pressure, a hydraulic pressure which urges said element in the opposite direction, said first valve containing a normally closed high pressure inlet valve element and said second valve comprising a normally closed outlet valve element, said two valves containing, also, respectively, a normally open outlet valve and a normally open high pressure inlet valve, both of said last mentioned valves having a hydraulic connection to said controlling device.

8. In combination, a source of liquid under pressure, an element adapted to be moved thereby, and hydraulic means for actuating the same comprising a controlling device, a hydraulic chamber connected to expand with the movement of said element and connected to said controlling device, a valve adapted to apply, by modulated increases of pressure, a hydraulic pressure for urging said element in one direction and a second valve adapted to correspondingly release, by modulated amounts of pressure, a hydraulic pressure which urges said element in the opposite direction, said valves being constructed to apply to said element an increase of the amount of liquid applied from either of said valves and a corresponding decrease of the amount of liquid from the other valve, said first valve containing a normally closed high pressure inlet valve element and said second valve comprising a normally closed outlet valve element, said two valves containing also, respectively, a normally open outlet valve and a normally open high pressure inlet valve, both of said last mentioned valves having a hydraulic connection to said controlling device.

9. In combination, a source of liquid under pressure, an element adapted to be moved thereby, a piston connected thereto, and hydraulic means for actuating the same comprising a controlling device, a hydraulic chamber in said piston connected to expand with the movement of said element and connected to said controlling device, a valve adapted to apply, by modulated increases of pressure, a hydraulic pressure for urging said element in one direction and a second valve adapted to correspondingly release, by modulated amounts of pressure, a hydraulic pressure which urges said element in the opposite direction, said first valve containing a normally closed high pressure inlet valve element and said second valve comprising a normally closed outlet valve element, said two valves containing also, respectively, a normally open outlet valve and a normally open high pressure inlet valve, both of said last mentioned valves having a hydraulic connection to said controlling device.

10. In combination, a source of liquid under pressure, an element adapted to be moved thereby, a piston connected thereto, and hydraulic means for actuating the same comprising a controlling device, a hydraulic chamber in said piston connected to expand with the movement of said element and connected to said controlling device, a valve adapted to apply, by modulated increases of pressure, a hydraulic pressure for urging said element in one direction and a second valve adapted to correspondingly release, by modulated amounts of pressure, a hydraulic pressure which urges said element in the opposite direction, said valves being constructed to apply to said element an increase of the amount of liquid applied from either of said valves and a corresponding decrease of the amount of liquid from the other valve, said first valve containing a normally closed high pressure inlet valve element and said second valve comprising a normally closed outlet valve element, said two valves containing also, respectively, a normally open outlet valve and a normally open high pressure inlet valve, both of said last mentioned valves having a hydraulic connection to said controlling device.

EDWARD A. ROCKWELL.